July 1, 1924.
F. J. HOLMES
1,499,659
CLUTCH MECHANISM
Filed May 4, 1920
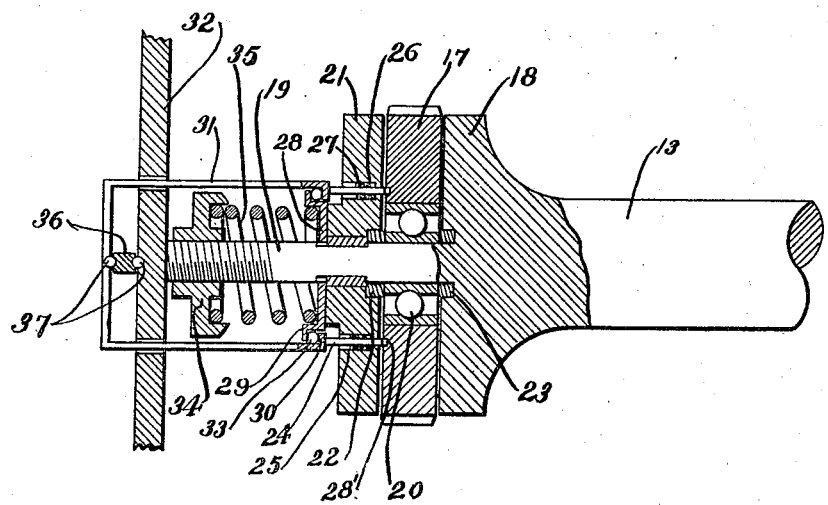
Inventor
F.J.Holmes.
Witness
By
Attorneys Patented July 1, 1924.

1,499,659

UNITED STATES PATENT OFFICE.

FREDERICK J. HOLMES, OF TOLEDO, OHIO, ASSIGNOR OF ONE-THIRD TO S. H. FOSTER, OF TOLEDO, OHIO.

CLUTCH MECHANISM.

Application filed May 4, 1920. Serial No. 378,883.

*To all whom it may concern:*

Be it known that I, FREDERICK J. HOLMES, a citizen of the United States, residing at Toledo, in the county of Lucas and State of Ohio, have invented a new and useful Clutch Mechanism, of which the following is a specification.

This invention relates to a clutch mechanism designed especially for the drive unit for internal combustion engines, one of its objects being to provide novel means whereby relatively rotatable members can be readily coupled to and uncoupled from each other by the manipulation of a wedging element, yielding means being provided for holding the relatively rotatable members normally coupled together.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawing which is an enlarged section through the clutch mechanism, the preferred form of the invention has been shown.

Referring to the drawing by characters of reference 13 designates a shaft having a collar 18 constituting a thrust bearing for a gear 17 or the like. A reduced stem 19 projects from the center of the collar and is provided with an anti-friction bearing 20 on which the gear 17 is mounted. A disk 21 is centered on the stem 19 and interposed between this disk and the anti-friction bearing are springs 22 while additional springs 23 are interposed between the bearing and the collar 18.

Pins 24 are slidably mounted in the disk 21 and extend through sockets 25 in the disk. In each of these sockets is arranged a spring 26 and a projection 27 is carried by each pin and bears against the spring so that the spring thus operates to press on the projection 27 and hold the pin 24 normally shifted out of engagement with the gear 17. Said gear has notches 28' adapted to receive the pins 24 under certain conditions.

Mounted on the stem 19 is a ring 28 having an annular offset flange 29 lapping an inwardly extending flange 30 carried by a yoke 31 which is slidably mounted within a suitable supporting structure 32. Anti-friction bearings 33 are interposed between the flanges 29 and 30. A nut 34 engages the threaded outer end portion of the stem 19 and constitutes a seat for one end of a coiled spring 35 the other end of which bears against the ring 28. This ring, in turn, thrusts through the bearings 33 against the flange 30 which pushes the pins 24 against the action of the springs 26 so as to be seated in the notches 28'.

An operating wedge 36 is interposed between the structure 32 and the intermediate portion of the yoke 31 and may be provided with suitable anti-friction bearings 37. Obviously, by pressing this wedge in one direction, the yoke 31 can be shifted longitudinally so as to pull upon the ring 28 and cause the spring 35 to be placed under compression. During this action the pins 24 will be released and their springs 26 will shift the pins out of the notches 28', thereby uncoupling the disk 21 from the gear 17.

By providing the springs 22 and 23 and mounting the gear 17 so that it can have a slight movement longitudinally of the shaft, the gear will be prevented from rubbing its faces upon adjacent parts while rotating freely and wear will thus be materially reduced.

What is claimed is:

1. The combination with a shaft having a stem, and a gear mounted for rotation on the stem, of a disk rotatable with the stem, coupling pins movably mounted in the disk, yielding means in the disk for holding the pins normally uncoupled from the gear, a ring slidable on the stem, an adjustable spring on the stem engaging the ring, a slidable yoke, means thereon for engaging the pins to transmit thrust thereto from the ring, and wedging means for shifting the yoke to compress the spring on the stem and release the coupling pins.

2. The combination with a rotatable stem, a disk rotatable therewith, and a member rotatable on the stem, of coupling pins carried by the disk and normally disengaged from the member, a spring pressed ring upon the stem, means for transmitting thrust from the ring to the pins for engagement with the member, a yoke extending from said means, and a wedge for shifting the yoke to release the pins and move the ring out of normal position.

In testimony that I claim the foregoing as my own, I have hereto affixed my signature in the presence of two witnesses.

FREDERICK J. HOLMES.

Witnesses:
 HERBERT D. LAWSON,
 AGNES ROCKELLI.